US012053974B2

(12) United States Patent
Ukai

(10) Patent No.: US 12,053,974 B2
(45) Date of Patent: Aug. 6, 2024

(54) PRINTING DEVICE INCLUDING RESTRICTION MEMBER RESTRICTING MOVEMENT OF HOLDER HOLDING PRINTING HEAD OR PLATEN ROLLER WHEN COVER IS AT POSITION OTHER THAN CLOSED POSITION

(71) Applicant: BROTHER KOGYO KABUSHIKI KAISHA, Nagoya (JP)

(72) Inventor: Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 81 days.

(21) Appl. No.: 17/725,885

(22) Filed: Apr. 21, 2022

(65) Prior Publication Data

US 2022/0242145 A1 Aug. 4, 2022

Related U.S. Application Data

(63) Continuation of application No. PCT/JP2020/034880, filed on Sep. 15, 2020.

(30) Foreign Application Priority Data

Oct. 24, 2019 (JP) ................................ 2019-193859

(51) Int. Cl.
*B41J 11/14* (2006.01)
*B41J 3/407* (2006.01)
(Continued)

(52) U.S. Cl.
CPC ............ *B41J 11/14* (2013.01); *B41J 3/4075* (2013.01); *B41J 11/04* (2013.01); *B41J 29/13* (2013.01); *B41J 3/36* (2013.01)

(58) Field of Classification Search
CPC . B41J 11/14; B41J 3/4075; B41J 11/04; B41J 29/13; B41J 3/36
See application file for complete search history.

(56) References Cited

U.S. PATENT DOCUMENTS 9,623,693 B2 * 4/2017 Katayama ................ B41J 29/56
2008/0003040 A1 * 1/2008 Sekino ....................... B41J 3/60 400/188

(Continued)

FOREIGN PATENT DOCUMENTS

CN 106103116 A 11/2016
JP 2007-098731 A 4/2007

(Continued)

OTHER PUBLICATIONS

International Preliminary Report On Patentability and English language Written Opinion of the International Search Report for PCT/JP2020/034880 dated May 5, 2022.

(Continued)

*Primary Examiner* — David H Banh
(74) *Attorney, Agent, or Firm* — KENEALY VAIDYA LLP

(57) ABSTRACT

A printing device includes: a housing having a cassette attachment opening; a cover; a printing head; a platen roller; a holder holding one of the printing head and the platen roller; and a restriction member. The cover is movable between: a closed position where the cover covers at least a portion of the cassette attachment opening; and an open position where a printing cassette accommodating a printing tape is attachable to the housing. The holder is movable between: a nipping position where the printing head and the platen roller nip the printing tape therebetween; and a non-nipping position where the printing head and the platen roller do not nip the printing tape therebetween. The restriction member restricts movement of the holder when the (Continued)

cover is at a position other than the closed position. The restriction member allows the movement of the holder when the cover is at the closed position.

24 Claims, 13 Drawing Sheets

(51) Int. Cl.

| | |
|---|---|
| ***B41J 11/04*** | (2006.01) |
| ***B41J 29/13*** | (2006.01) |
| *B41J 3/36* | (2006.01) |

(56) References Cited

U.S. PATENT DOCUMENTS

2011/0188917 A1* 8/2011 Naito ....................... B41J 11/04 400/663
2016/0361930 A1 12/2016 Sodeyama et al.
2016/0368294 A1 12/2016 Sakano et al.
2019/0061393 A1* 2/2019 Kakui ...................... B41J 15/04

FOREIGN PATENT DOCUMENTS

| | | |
|---|---|---|
| JP | 2011-046142 A | 3/2011 |
| JP | 2015-182318 A | 10/2015 |
| WO | 2021/079652 A1 | 4/2021 |

OTHER PUBLICATIONS

Japanese Office Action for the related Japanese Patent Application No. 2019-193859 dated May 30, 2023.
International Search Report and Written Opinion of the International Search Report for PCT/JP2020/034880 dated Nov. 17, 2020.
Chinese Office Action for the related Chinese Patent Application No. 202080073796.7 dated Feb. 1, 2024.

* cited by examiner

PRINTING DEVICE INCLUDING RESTRICTION MEMBER RESTRICTING MOVEMENT OF HOLDER HOLDING PRINTING HEAD OR PLATEN ROLLER WHEN COVER IS AT POSITION OTHER THAN CLOSED POSITION

CROSS REFERENCE TO RELATED APPLICATIONS

This is a by-pass continuation application of International Application No. PCT/JP2020/034880 filed Sep. 15, 2020 claiming priority from Japanese Patent Application No. 2019-193859 filed Oct. 24, 2019. The entire contents of the International Application and the priority application are incorporated herein by reference.

BACKGROUND

There has been conventionally known a printing device for printing an image on a printing tape. A printing cassette accommodating therein the printing tape is attachable to and detachable from a housing of the printing device for the purpose of replacement of the printing cassette and supply of the printing tape. According to one conventional printing device, movement of a platen roller toward a nipping position at which the printing tape is nipped is performed in interlocking relation to a closing operation of a cover for covering the tape cassette accommodated in the housing.

SUMMARY

With the conventional printing device described above, the platen roller is likely to improperly nip the printing tape after the tape cassette is accommodated in the housing, whereby problems such as contortion or folding of the printing tape may occur.

In view of the foregoing, it is an object of the present disclosure to provide a printing device capable of restraining disfiguration of a printing tape which may be caused by nipping the printing tape with a platen roller after the tape cassette is attached to a housing.

In order to attain the above and other objects, the present disclosure provides a printing device including: a housing; a cover; a printing head; a platen roller; a holder; and a restriction member. The housing has a cassette attachment opening through which a printing cassette is attachable to the housing. The printing cassette accommodates therein a printing tape. The cover is movable between: a closed position in which the cover covers at least a portion of the cassette attachment opening; and an open position in which the cover allows the printing cassette to be attached to the housing through the cassette attachment opening. The printing head is provided inside the housing and extends toward the cassette attachment opening. The platen roller is provided inside the housing and faces the printing head. The holder holds one of the printing head and the platen roller. The holder is movable between: a nipping position in which the printing head and the platen roller nip the printing tape therebetween; and a non-nipping position in which the printing head and the platen roller do not nip the printing tape therebetween. The restriction member restricts movement of the holder when the cover is at a position other than the closed position. The restriction member allows the movement of the holder when the cover is at the closed position.

With this configuration, the one of the printing head and the platen roller held by the holder is moved after the cover has been moved to the closed position. Accordingly, displacement of the printing tape attached to the housing can be restrained due to a user touching the printing tape while the platen roller is in contact with the printing tape. Consequently, a problem occurred by nipping the printing tape with the platen roller is hard to occur.

According to another aspect, the present disclosure also provides a printing device including: a housing; a printing head; a platen roller; and a movable member. The housing has a cassette attachment opening through which a printing cassette is attachable to the housing. The printing cassette accommodates therein a printing tape. The printing head is provided inside the housing and extends toward the cassette attachment opening. The platen roller is provided inside the housing and faces the printing head. The movable member includes a holder holding one of the printing head and the platen roller. The holder is movable between: a nipping position in which the printing head and the platen roller nip the printing tape therebetween; and a non-nipping position in which the printing head and the platen roller do not nip the printing tape therebetween. A moving direction of the holder from the nipping position to the non-nipping position crosses an attachment direction of the printing cassette to the housing. The housing further has an opening formed at an outer surface of the housing. The movable member is exposed to an outside of the housing through the opening.

With this configuration, since the moving direction of the holder crosses the attachment direction of the printing cassette, the printing cassette is hard to be moved in the attachment direction due to a load for moving the holder. Accordingly, the movement of the printing cassette while the platen roller is in contact with the printing tape can be restricted, thereby avoiding occurrence of problems with respect to the printing tape occurred by nipping the printing tape by the platen roller.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. Embodiment

Hereinafter, a printing device 1 according to one embodiment of the present disclosure will be described with reference to the accompanying drawings.

1-1. Configuration

Figure 1A:
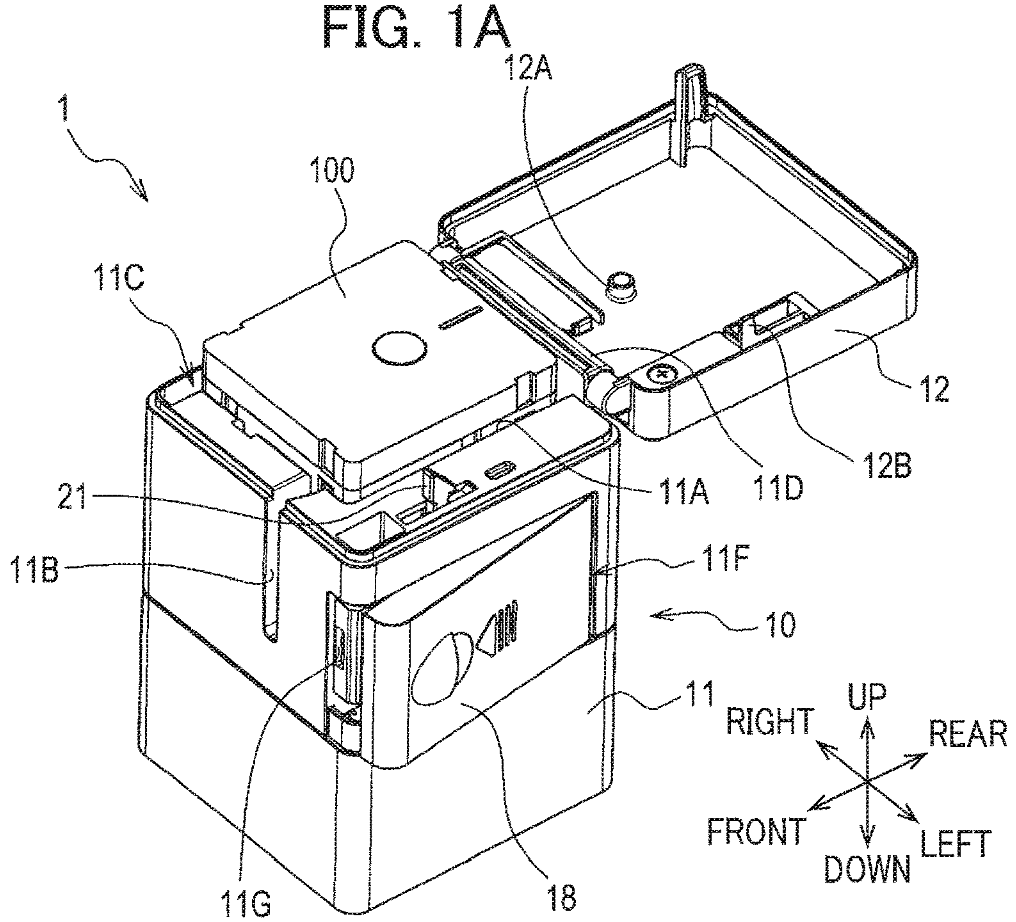
FIG. 1A is a schematic perspective view of a printing device.
Figure 1B:
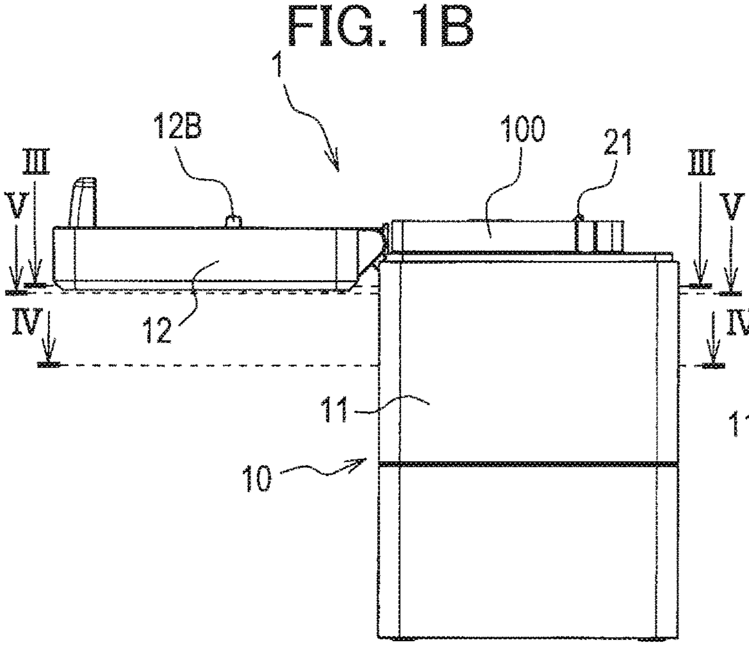
FIG. 1B is a schematic right side view of the printing device illustrated in FIG. 1A.
Figure 1C:
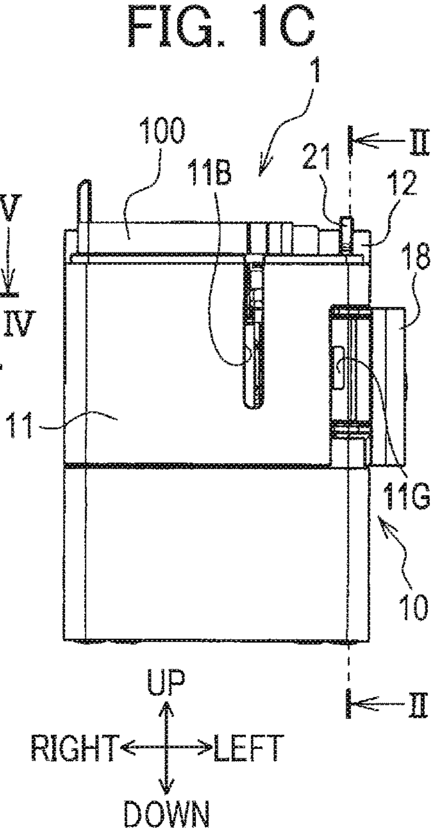
FIG. 1C is a schematic front view of the printing device illustrated in FIG. 1A.

The printing device 1 illustrated in FIGS. 1A to 1C includes a device body 10, and a printing cassette 100. The printing device 1 is configured to perform printing on a tape-like printing medium.

[Device Body]

As illustrated in FIGS. 2 through 5, the device body 10 includes a housing 11, a cover 12, a printing head 13, a head holding portion 14, a platen roller 15, a platen gear 16, a drive shaft 17, a movable member 18, a restriction member 21, a first spring 31, a second spring 32, a third spring 33, and a fourth spring 34. Note that illustration of the printing cassette 100 is omitted in FIGS. 2 and 3.

In the following description, a direction in which a rotation axis of the platen roller 15 (see FIG. 4) extends will be referred to as an "up-down direction", a direction perpendicular to the up-down direction and a direction in which a printing tape is discharged from the device body 10 will be referred to as a "front-rear direction", and a direction perpendicular to the up-down direction and the front-rear direction will be referred to as a "left-right direction".

[Housing]

As illustrated in FIG. 1A, the housing 11 has a cassette attachment opening 11A, a discharge opening 11B through which the printing tape is discharged out of the housing 11, and a recessed portion 11C for accommodating therein at least a portion of the printing cassette 100.

The cassette attachment opening 11A is formed on an upper surface of the housing 11. The housing 11 is configured to receive the printing cassette 100 accommodating therein the printing tape through the cassette attachment opening 11A. That is, the printing cassette 100 is moved through the cassette attachment opening 11A during an attachment process of the printing cassette 100 to the housing 11.

The discharge opening 11B is formed on a front surface of the housing 11. The cassette attachment opening 11A and the discharge opening 11B are in communication with the recessed portion 11C. The recessed portion 11C is formed inside the housing 11. The recessed portion 11C functions to position the printing cassette 100 in the housing 11.

The housing 11 has a rectangular parallelepiped shape constituted by the upper surface and a lower surface those are perpendicular to the up-down direction, a right surface and a left surface those are perpendicular to the left-right direction, and the front surface and a rear surface those are perpendicular to the front-rear direction. The printing cassette 100 is inserted downward through the cassette attachment opening 11A toward the recessed portion 11C to be attached to the recessed portion 11C.

[Cover]

The cover 12 is movable between a closed position (a position illustrated in FIGS. 6A to 7) in which the cover 12 covers at least a portion of the cassette attachment opening 11A, and an open position (a position illustrated in FIGS. 1A to 2) in which the cover 12 allows the printing cassette 100 to be attached to the recessed portion 11C through the cassette attachment opening 11A. In the present embodiment, the cover 12 at the closed position covers the entire portion of the cassette attachment opening 11A.

Specifically, a hinge 11D is provided at a rear-upper portion of the housing 11, and the cover 12 is attached to the hinge 11D. The cover 12 is pivotally movable relative to the housing 11 about a pivot axis extending in the left-right direction. The pivot axis of the cover 12 (i.e., the hinge 11D) is positioned on the opposite side of the rotation axis of the platen roller 15 from the discharge opening 11B in the front-rear direction.

Figure 2:
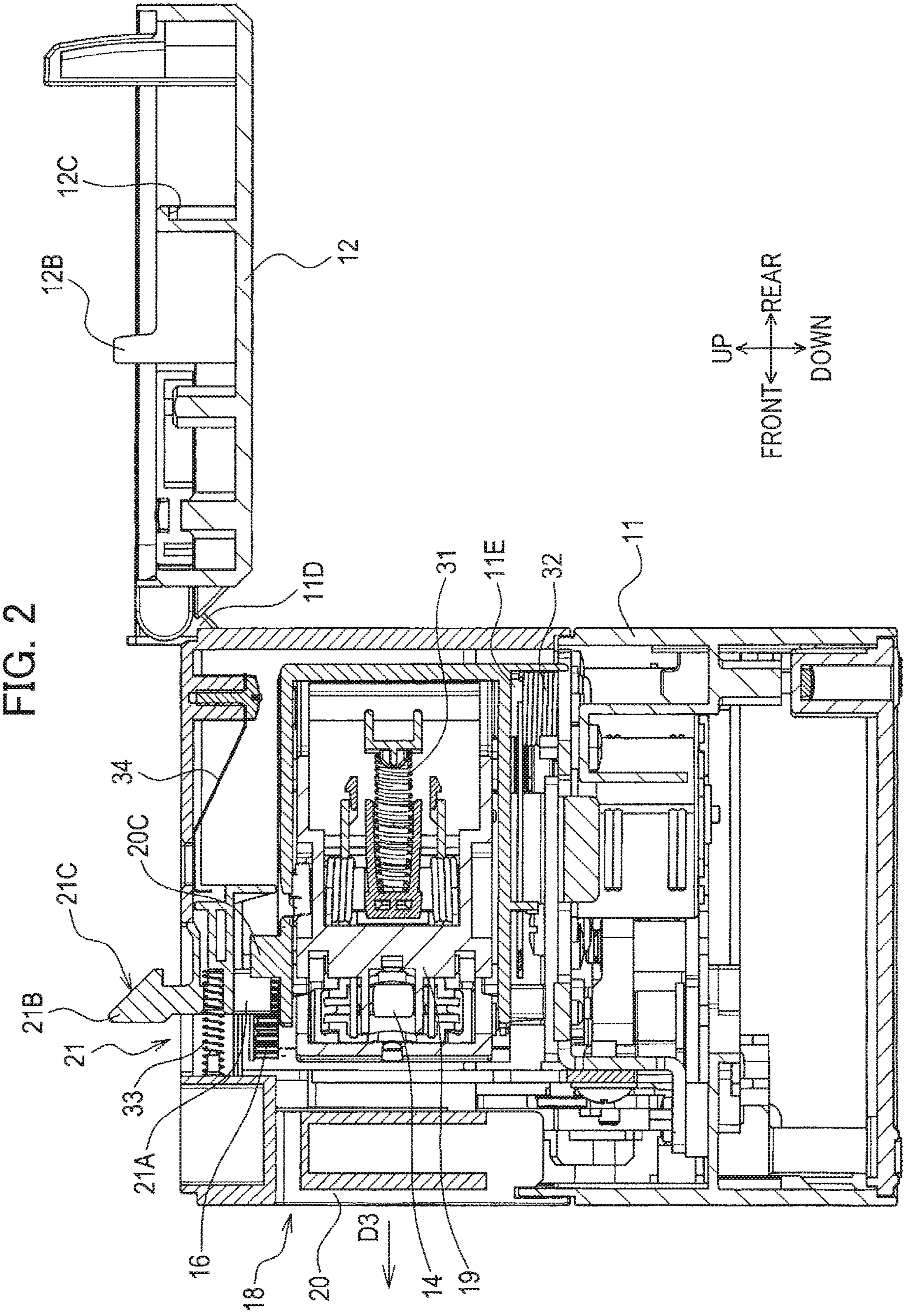
FIG. 2 is a schematic cross-sectional view of the printing device taken along a line II-II in FIG. 1C.

As illustrated in FIGS. 1A and 2, the cover 12 includes a pressure portion 12A, a first abutment portion 12B, and an engagement portion 12C. When the cover 12 is at the closed position, the pressure portion 12A protrudes downward to press the printing cassette 100 downward, the first abutment portion 12B also protrudes downward to abut against the fourth spring 34 (see FIG. 11, described later), and the engagement portion 12C is engaged with the restriction member 21 (described later).

[Printing Head]

Figure 4:
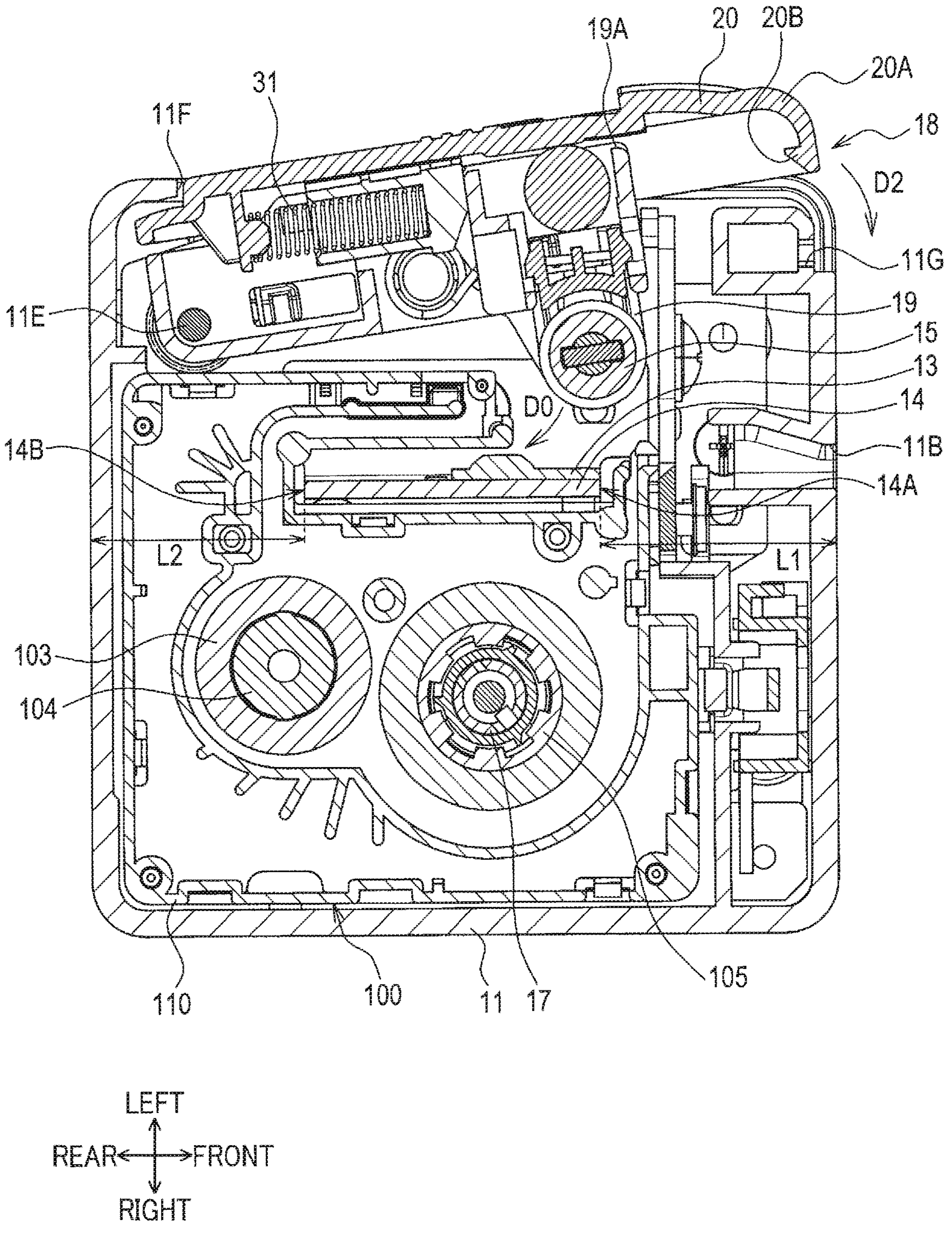
FIG. 4 is a schematic cross-sectional view of the printing device taken along the line IV-IV in FIG. 1B.

The printing head 13 illustrated in FIG. 4 is configured to perform printing on the printing tape in the printing cassette 100. The printing head 13 is provided inside the housing 11, and extends from an inside of the housing 11 toward the cassette attachment opening 11A. The printing head 13 has a plate-like shape having a thickness in the left-right direction.

The printing head 13 includes a plurality of heat generating elements. The heat generating elements are individually controlled to selectively generate heat. The printing tape is conveyed by the platen roller 15 to a position overlapped with the printing head 13, and is pressed through an ink ribbon against the printing head 13 in which the heat generating elements are selectively heated. Through this operation, ink retained on a surface of the ink ribbon is partially transferred to the printing tape, thereby forming an image such as letter and mark on the printing tape.

[Head Holding Portion]

The head holding portion 14 holds the printing head 13. The head holding portion 14 is a metal plate having a thickness in the left-right direction. The printing head 13 is attached to a left surface of the head holding portion 14. The head holding portion 14 functions as a heat sink for dissipating heat generated in the printing head 13.

The head holding portion 14 has a first end 14A and a second end 14B in a conveying direction in which the printing tape is conveyed at the printing head 13 (i.e., the frontward direction). That is, the first end 14A is a front end of the head holding portion 14, and positioned downstream of the second end 14B in the conveying direction, and the second end 14B is a rear end of the head holding portion 14.

As illustrated in FIG. 4, a distance L1 in the conveying direction between the first end 14A and a portion on an outer surface of the housing 11 positioned close to the first end 14A (i.e., the front surface of the housing 11) is greater than a distance L2 in the conveying direction between the second end 14B and a portion of the outer surface of the housing 11 positioned close to the second end 14B (i.e., the rear surface of the housing 11).

[Platen Roller]

The platen roller 15 is configured to convey the printing tape accommodated inside the printing cassette 100 to an outside of the printing cassette 100. The rotation axis of the platen roller 15 extends in the up-down direction.

The platen roller 15 is provided inside the housing 11 and faces the printing head 13. The platen roller 15 is movable between a position illustrated in FIG. 4 in which the platen roller 15 is positioned away from the printing head 13, and a position illustrated in FIG. 8 in which the platen roller 15 presses the printing tape against the printing head 13, (i.e., the platen roller 15 nip the printing tape in cooperation with the printing head 13).

[Platen Gear]

The platen gear 16 is provided inside the housing 11, and is connected to the platen roller 15 to drive the same. The platen gear 16 is movable between a position illustrated in FIG. 5 in which the platen gear 16 is positioned away from an output gear 106 (described later) of the printing cassette 100, and a position illustrated in FIG. 9 in which the platen gear 16 is in meshing engagement with the output gear 106. In the present embodiment, the platen gear 16 has a rotation axis in line with the rotation axis of the platen roller 15. That is, the platen gear 16 is coaxial with the platen roller 15.

[Drive Shaft]

Figure 3:
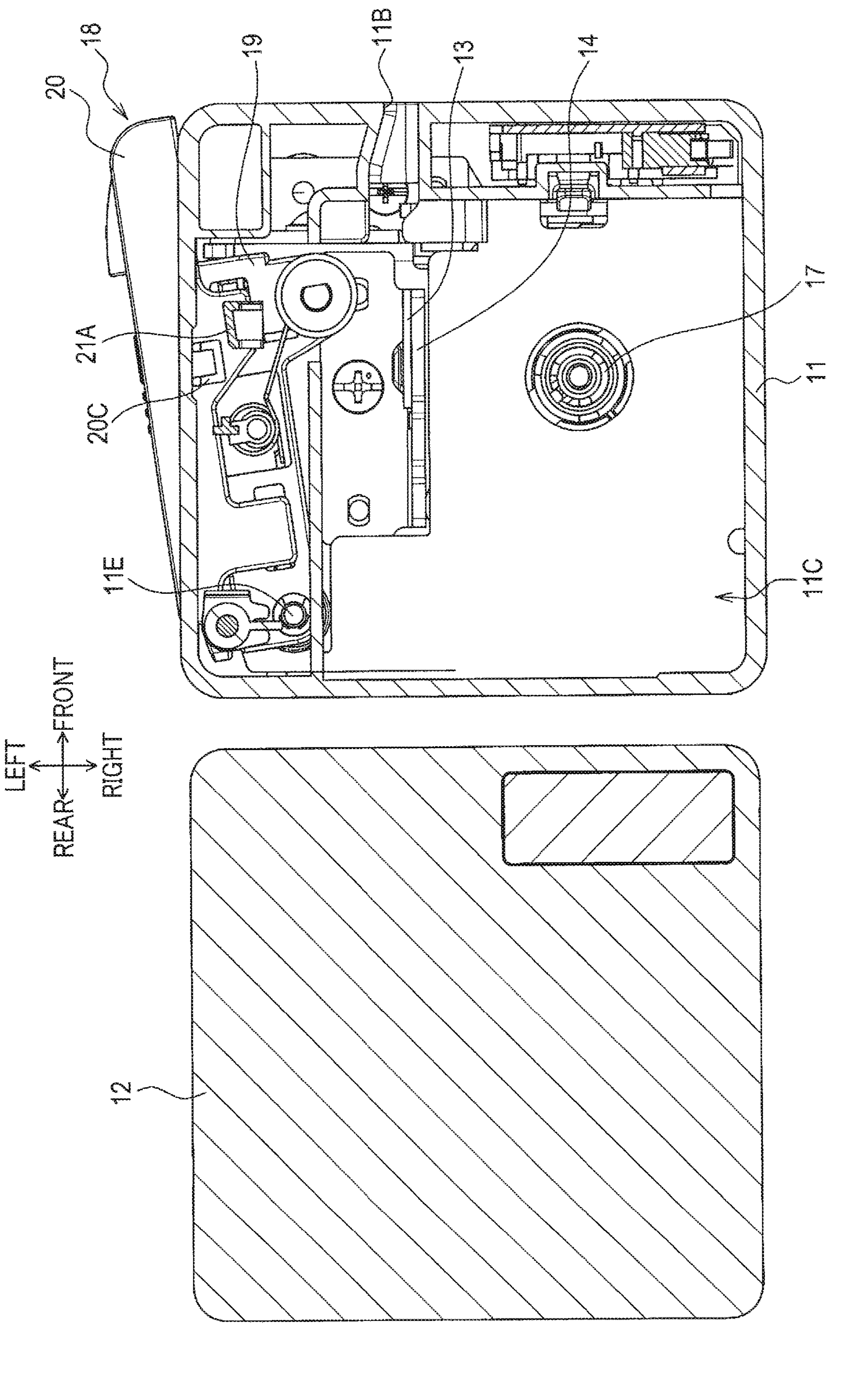
FIG. 3 is a schematic cross-sectional view of the printing device taken along a line III-III in FIG. 1B.

As illustrated in FIG. 3, the drive shaft 17 is also provided inside the housing 11. The drive shaft 17 is driven by a drive source such as a motor (not illustrated) to be rotatable about a rotation axis extending in the up-down direction.

As illustrated in FIG. 4, in a state where the printing cassette 100 is attached to the housing 11, the drive shaft 17 is inserted through and engaged with a take-up spool 105 (described later) of the printing cassette 100, and is also inserted through and engaged with an input gear 107 (see FIG. 5, described later) of the printing cassette 100 to rotate both the take-up spool 105 and the input gear 107.

[Movable Member]

The movable member 18 is a member configured to change relative positional relationship between the printing head 13 and the platen roller 15 to switch nip condition of the printing tape (i.e., whether the printing tape is nipped or not nipped between the printing head 13 and the platen roller 15). The movable member 18 includes a holder 19, and a lever 20.

[Holder]

The holder 19 holds the platen roller 15, and is movable between a nipping position (a position illustrated in FIG. 8) in which the printing head 13 and the platen roller 15 nip the printing tape therebetween, and a non-nipping position (a position illustrated in FIG. 4) in which the printing head 13 and the platen roller 15 do not nip the printing tape therebetween.

Specifically, a pivot shaft 11E extending in the up-down direction is provided at a left-rear portion inside the housing 11, and the holder 19 is attached to the pivot shaft 11E. The holder 19 is pivotally movable about a pivot axis (i.e., the pivot shaft 11E) relative to the housing 11.

The holder 19 has a front end portion 19A which is an end of the holder 19 opposite the pivot shaft 11E in the front-rear direction. The platen roller 15 and the platen gear 16 are rotatably supported by the front end portion 19A. The platen gear 16 is positioned away the output gear 106 when the holder 19 is at the non-nipping position, and is in meshing engagement with the output gear 106 when the holder 19 is at the nipping position.

As illustrated in FIG. 4, a moving direction D0 in which the holder 19 is pivotally moved from the non-nipping position to the nipping position crosses an attachment direction of the printing cassette 100 to the housing 11 (that is, the downward direction or an inserting direction of the printing cassette 100 through the cassette attachment opening 11A).

At least a portion of the holder 19 protrudes further outward than the outer surface of the housing 11 when the holder 19 is at the non-nipping position (that is, when the lever 20 is at a first position described later). In the present embodiment, the front end portion 19A of the holder 19 protrudes further leftward than the left surface of the housing 11 when the holder 19 is at the non-nipping position.

Figure 8:
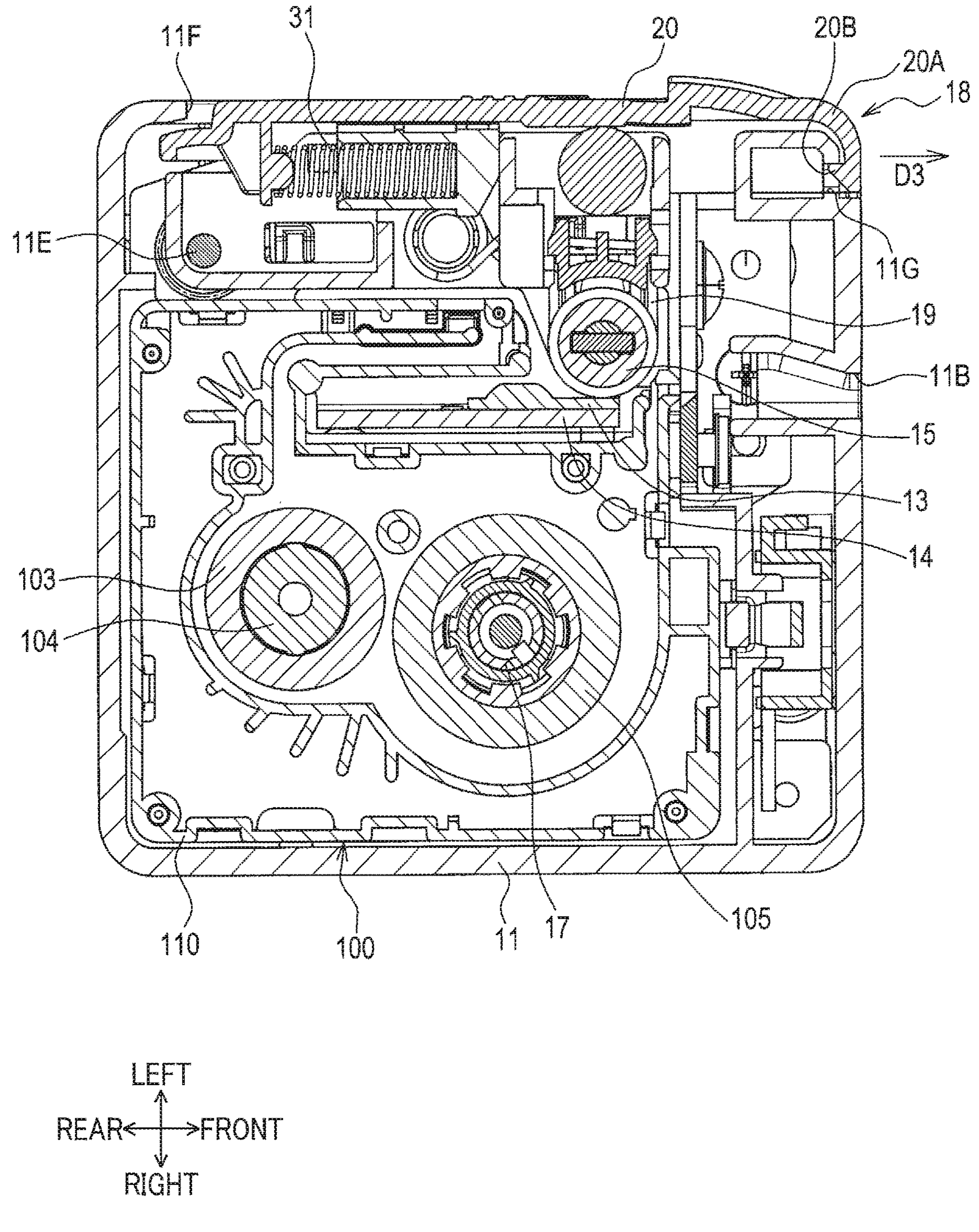
FIG. 8 is a schematic cross-sectional view of the printing device taken along a line VIII-VIII in FIG. 6B.

The holder 19 may be disposed so that an outer end surface of the holder 19 is flush with the outer surface of the housing 11, or the entire portion is positioned further inward than the outer surface of the housing 11 when the holder 19 is at the nipping position. In the present embodiment, a left end of the holder 19 (i.e., a left surface of the holder 19) is positioned further inward than the left surface of the housing 11 as illustrated in FIG. 8.

[Lever]

The lever 20 is attached to the holder 19. The lever 20 is positioned further outward than the holder 19 relative to the housing 11. The lever 20 is pivotally movable in a second direction D2 (see FIG. 4) from the first position (see FIG. 4) to a second position (see FIG. 8) together with the holder 19. Specifically, movement of the lever 20 from the first position to the second position causes movement of the holder 19 from the non-nipping position to the nipping position.

The lever 20 is further movable in a third direction D3 (see FIG. 8) crossing the second direction D2. The third direction D3 is directed frontward such that the lever 20 is moved frontward relative to the holder 19 and the housing 11. That is, the lever 20 is slidingly movable frontward relative to the holder 19 at the nipping position.

Figure 10A:
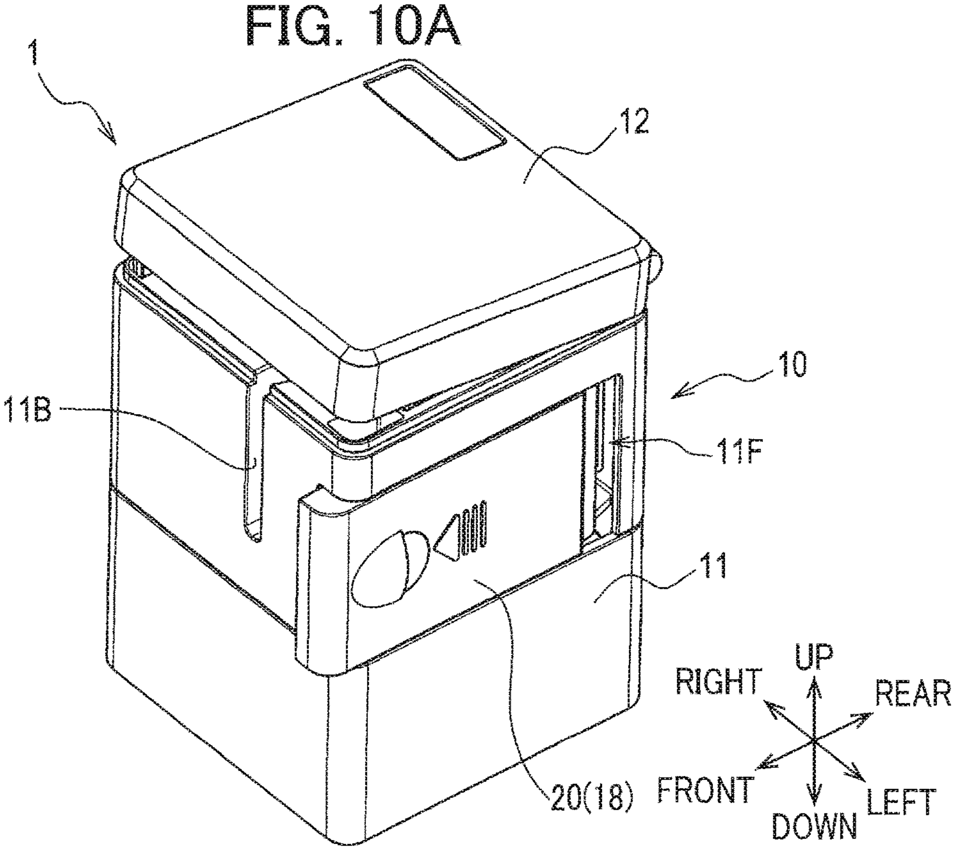
FIG. 10A is a schematic perspective view of the printing device illustrated in FIG. 1A, and particularly illustrating a state where a lever of the printing device is at its third position.
Figure 10B:
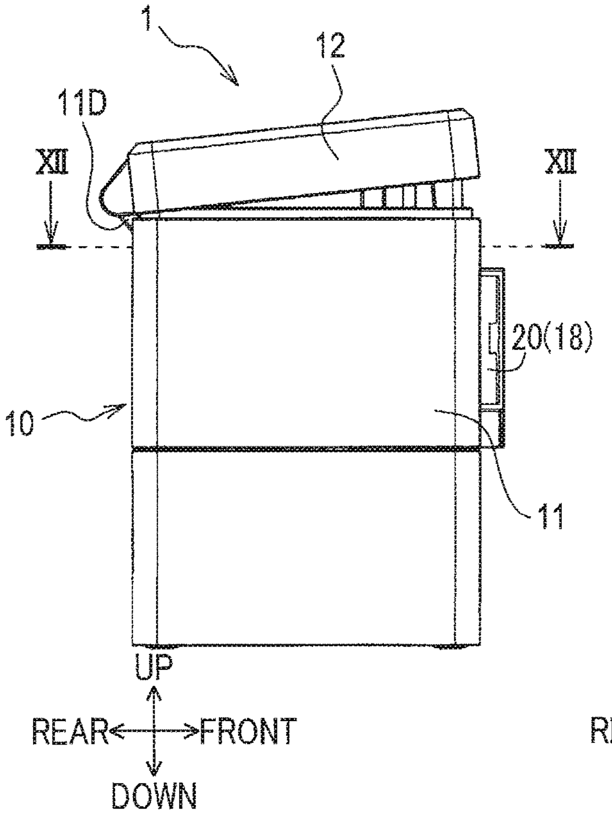
FIG. 10B is a schematic right side view of the printing device illustrated in FIG. 10A.
Figure 10C:
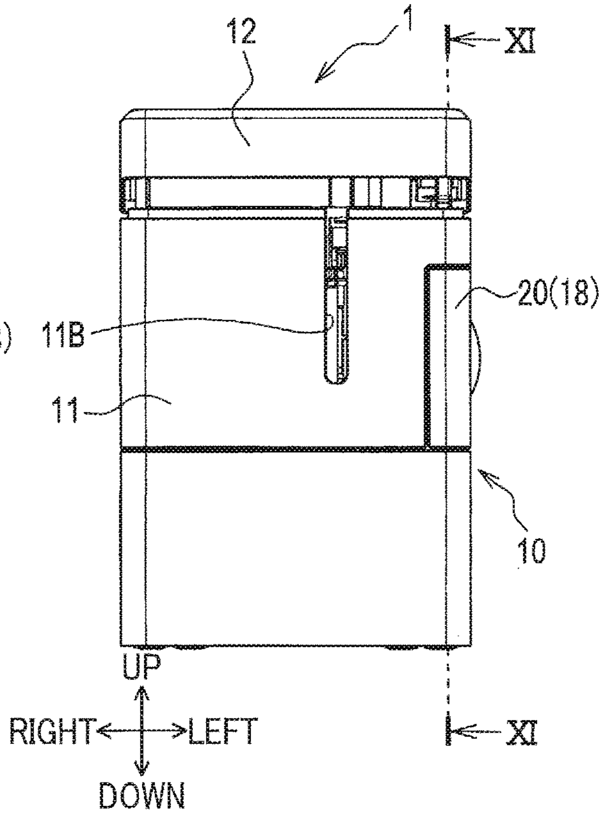
FIG. 10C is a schematic front view of the printing device illustrated in FIG. 10A.

The third direction D3 is parallel to the conveying direction (that is, the front-rear direction) in which the printing tape is conveyed by the platen roller 15. The lever 20 is configured to be moved from the second position illustrated in FIG. 8 to a third position illustrated in FIGS. 10A to 10C as the lever 20 is slidingly moved in the third direction D3.

The second direction D2 and the third direction D3 are parallel to the left-right direction and the front-rear direction, respectively. That is, the moving direction of the lever 20 is parallel to an imaginary plane perpendicular to the rotation axis of the platen roller 15.

As illustrated in FIG. 4, at least a portion of the lever 20 protrudes further outward than the outer surface of the housing 11 when the lever 20 is at the first position. In the present embodiment, a front end portion 20A of the lever 20 protrudes further leftward than the left surface of the housing 11 when the lever 20 is at the first position. Hence, the movable member 18 is exposed to an outside through an opening 11F formed at the outer surface (the left surface) of the housing 11.

As illustrated in FIG. 8, the lever 20 has a portion (i.e., the front end portion 20A) whose outer surface is flush with the outer surface of the housing 11 when the lever 20 is at the second position. In the present embodiment, the outer surface of the front end portion 20A is flush with the front surface of the housing 11 when the lever 20 is at the second position.

The lever 20 further includes a pawl 20B at a right end of the front end portion 20A. The pawl 20B is configured to be engaged with a groove 110 formed at the housing 11 when the lever 20 is at the second position. The lever 20 can be maintained at the second position by virtue of engagement of the pawl 20B with the groove 11G.

Figure 7:
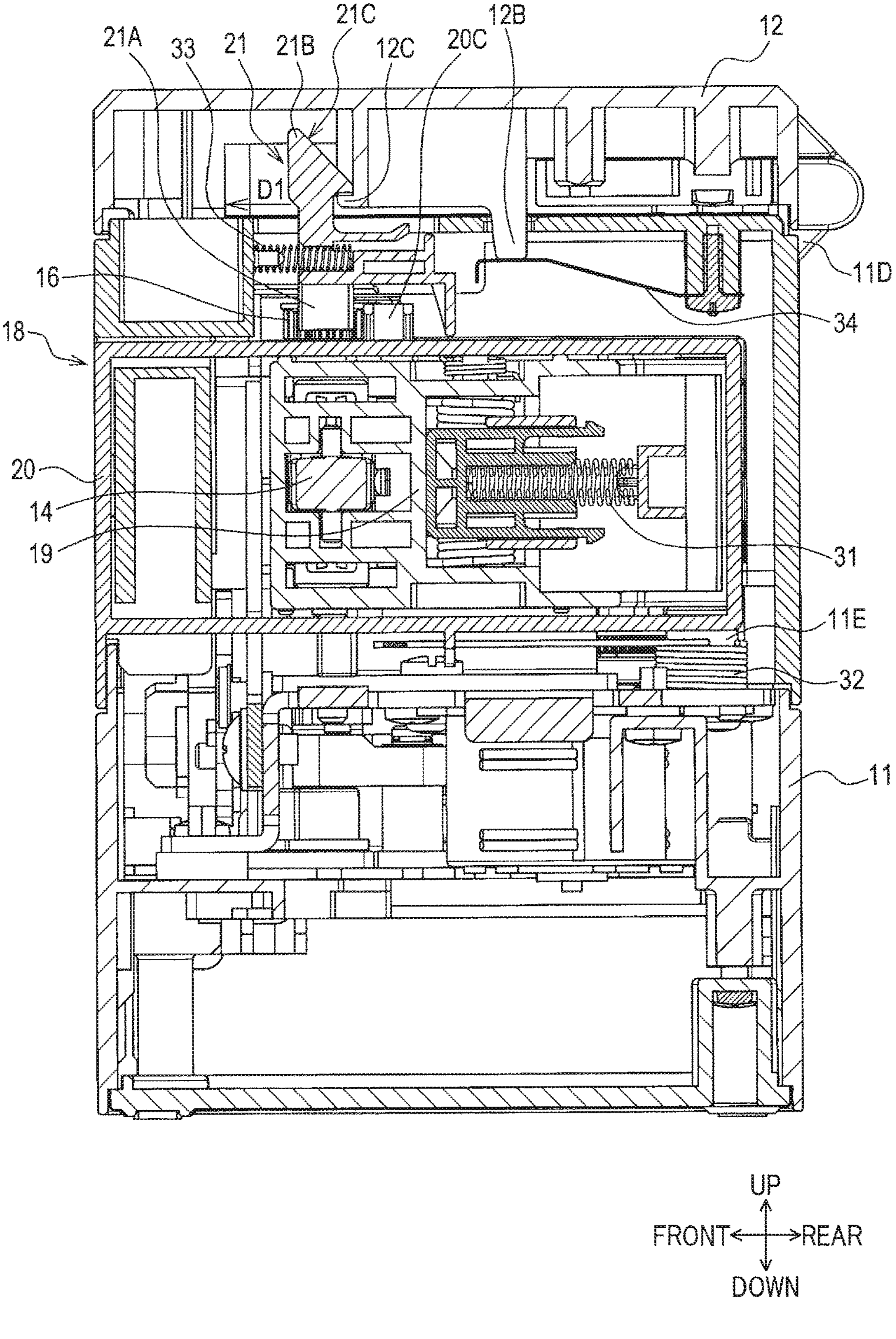
FIG. 7 is a schematic cross-sectional view of the printing device taken along a line VII-VII in FIG. 6C.
Figure 9:
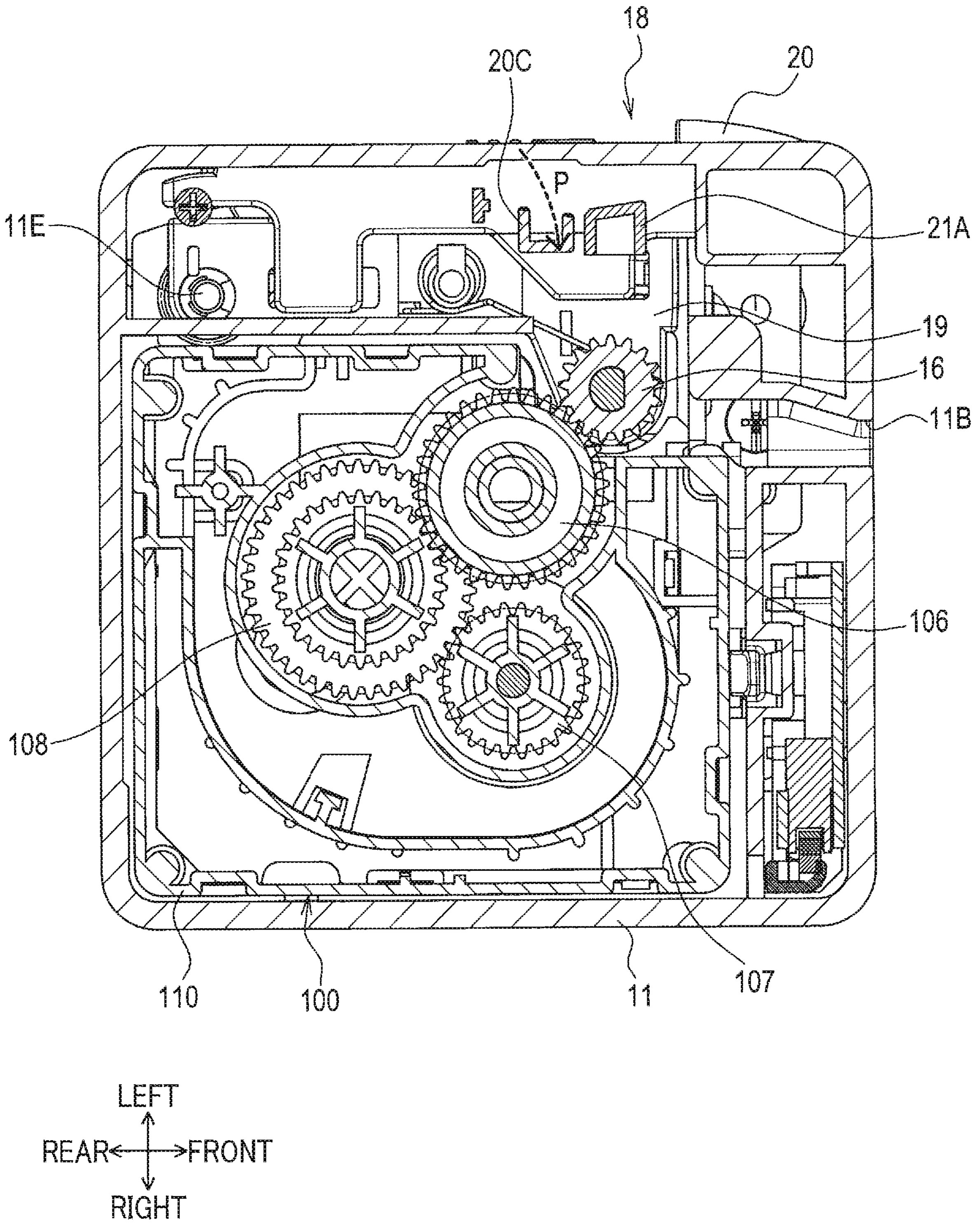
FIG. 9 is a schematic cross-sectional view of the printing device taken along a line IX-IX in FIG. 6B.

As illustrated in FIGS. 7 and 9, the lever 20 also includes a second abutment portion 20C configured to abut against the restriction member 21 (described later). The second abutment portion 20C is positioned further upward than the holder 19 and protrudes upward. The second abutment portion 20C is movable along a moving path P as indicated by a broken like arrow in FIGS. 5 and 9 in accordance with the movement of the lever 20 from the first position to the second position. The second abutment portion 20C is an example of an abutment portion.

[Restriction Member]

The restriction member 21 is a member configured to restrict the movement of the holder 19 when the cover 12 is at a position other than the closed position, and to allow the movement of the holder 19 when the holder 19 is at the closed position.

As illustrated in FIG. 2, the restriction member 21 includes a third abutment portion 21A, and a locking portion 21B. The third abutment portion 21A extends downward and has a portion overlapped with the second abutment portion 20C of the lever 20 in the front-rear direction and the left-right direction.

The locking portion 21B extends further upward than the upper end of the housing 11. As illustrated in FIG. 7, the locking portion 21B is configured to be engaged with the engagement portion 12C of the cover 12 at the closed position to retain (lock) the cover 12 at the closed position. The locking portion 21B has a tapered surface 21C inclined such that a protruding length in the upward direction of the locking portion 21B is gradually reduced as extending toward a rear end of the locking portion 21B. That is, the tapered surface 21C is inclined diagonally downward and rearward.

The restriction member 21 is disposed inside the housing 11 and is supported by the housing 11 so as to be movable in the front-rear direction. Specifically, the restriction member 21 is movable from a restricting position (a position illustrated in FIG. 5) in which the restriction member 21 restricts the movement of the holder 19 to a retracted position (a position illustrated in FIG. 9) in which the restriction member 21 allows the movement of the holder 19 as the restriction member 21 is slidingly moved frontward.

Figure 5:
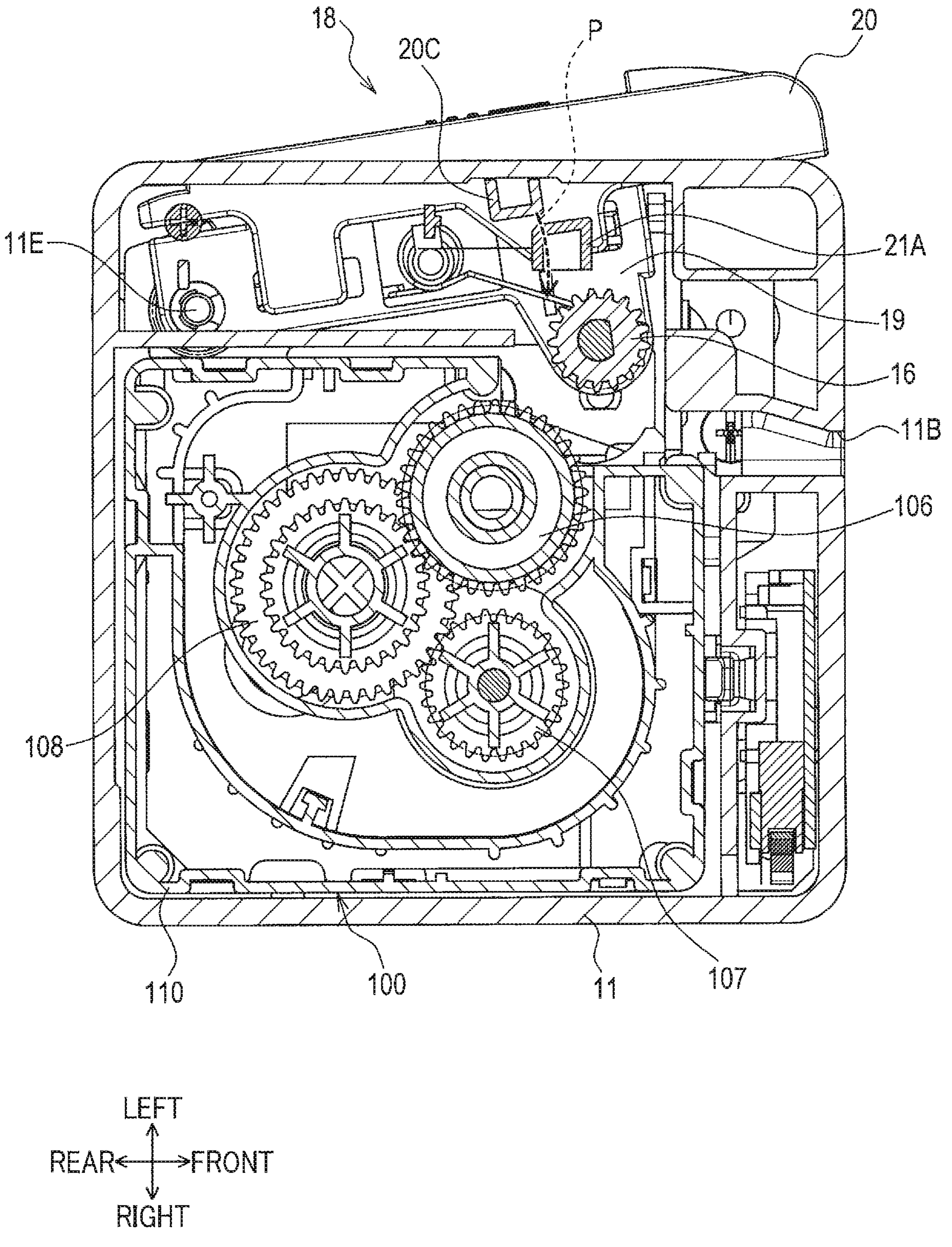
FIG. 5 is a schematic cross-sectional view of the printing device taken along the line V-V in FIG. 1B.

The restriction member 21 is overlapped with a moving locus of the lever 20 from the first position to the second position when the restriction member 21 is at the restricting position. Specifically, as illustrated in FIG. 5, the third abutment portion 21A of the restriction member 21 is overlapped with the moving path P of the second abutment portion 20C.

On the other hand, as illustrated in FIG. 9, the restriction member 21, i.e., the third abutment portion 21A is offset from the moving locus of the lever 20, i.e., the moving path P of the second abutment portion 20C when the restriction member 21 is at the retracted position.

In accordance with the movement of the cover 12 from the open position toward the closed position, the engagement portion 12C of the cover 12 is brought into abutment against the tapered surface 21C of the locking portion 21B from above. As the engagement portion 12C is further moved downward, the tapered surface 21C is pressed frontward by the engagement portion 12C. As a result, the restriction member 21 is slidingly moved frontward from the restricting position toward the retracted position. The restriction member 21 reaches the retracted position upon completion of the movement of the cover 12 to the closed position.

As illustrated in FIG. 7, when the cover 12 is at the closed position, the locking portion 21B is engaged with the engagement portion 12C such that a rear end portion of the locking portion 21B is positioned above to cover a free end portion of the engagement portion 12C. Upward displacement of the engagement portion 12C is restricted by the locking portion 21B, since the locking portion 21B is urged toward the engagement portion 12C (that is, urged rearward) by the third spring 33 (described later). That is, the restriction member 21 retains (locks) the cover 12 at the closed position when the restriction member 21 is at the retracted position.

Figure 11:
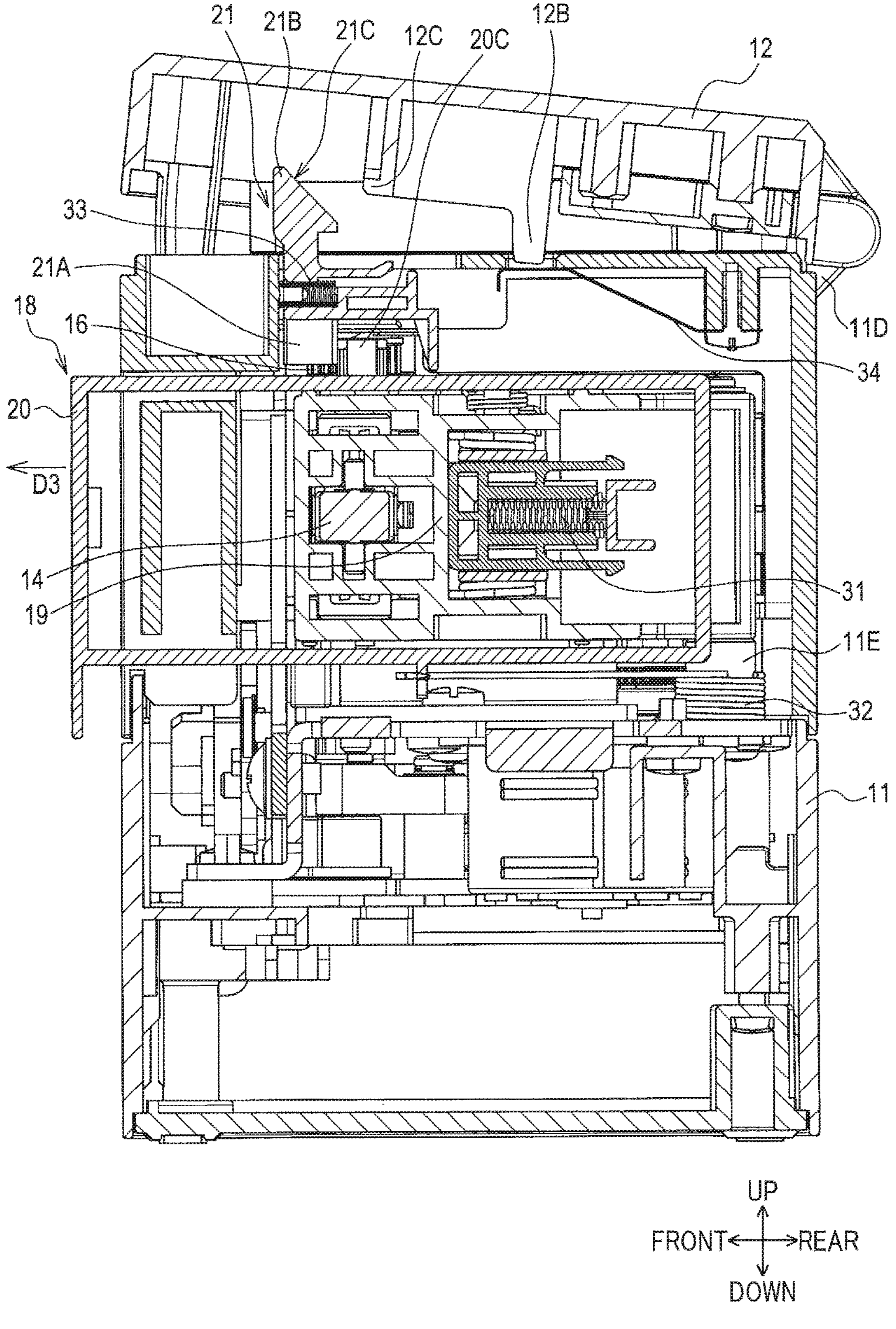
FIG. 11 is a schematic cross-sectional view of the printing device taken along a line XI-XI in FIG. 10C.

The restriction member 21 is further slidingly movable from the retracted position to a release position (see FIG. 11). The restriction member 21 at the release position is positioned further in a first direction D1 (see FIG. 7) directed from the restricting position to the retracted position than the restriction member 21 at the retracted position. That is, the restriction member 21 at the release position is positioned further frontward than the restriction member 21 at the retracted position.

The restriction member 21 is moved from the retracted position to the release position in accordance with the movement of the lever 20 in the third direction D3 (i.e., in accordance with the movement in the frontward direction of the lever 20). Specifically, the second abutment portion 20C of the lever 20 presses the third abutment portion 21A of the restriction member 21 frontward, thereby moving the restriction member 21 to the release position.

As the restriction member 21 is moved from the retracted position to the release position, the locking portion 21B is disengaged from the engagement portion 12C. That is, the locking portion 21B unlocks the cover 12 when the locking portion 21B is at the release position to allow the cover 12 to be moved to the open position.

Figure 12:
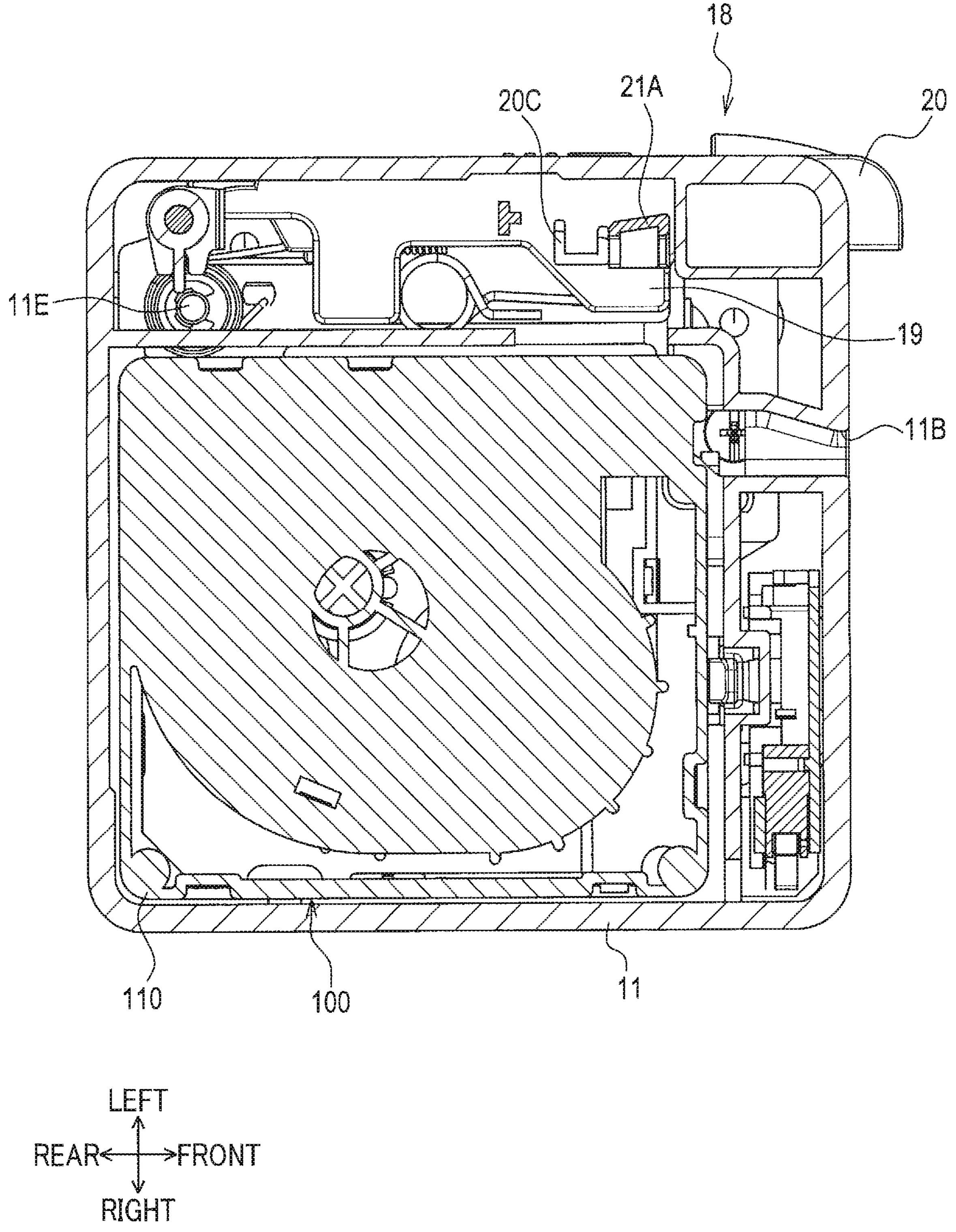
FIG. 12 is a schematic cross-sectional view of the printing device taken along a line XII-XII in FIG. 10B.

Incidentally, as illustrated in FIG. 12, the holder 19 is at the nipping position when the restriction member 21 is at the release position. A rear surface of the third abutment portion 21A of the restriction member 21 is in abutment against a front surface of the second abutment portion 20C of the lever 20 in the front-rear direction.

[Springs]

As illustrated in FIGS. 2 and 4, the first spring 31 is a coil spring disposed to be spanned between the lever 20 and the holder 19. That is, the first spring 31 has one end connected to the lever 20, and another end connected to the holder 19. The first spring 31 is a compression coil spring that can expand and contract in the front-rear direction. The first spring 31 urges the lever 20 in a direction opposite the third direction D3, i.e., urges the lever 20 rearward.

As illustrated in FIG. 2, the second spring 32 is a torsion spring wound over the pivot shaft 11E of the housing 11, and has one end connected to the holder 19. The second spring 32 urges the holder 19 from the nipping position toward the non-nipping position, that is, urges the holder 19 outward away from the housing 11.

As illustrated in FIGS. 2 and 7, the third spring 33 is a coil spring disposed to be spanned between the restriction member 21 and the housing 11. In other words, the third spring 33 has one end connected to the restriction member 21, and another end connected to the housing 11. The third spring 33 is a compression coil spring that can expand and contract in the front-rear direction. The third spring 33 urges the restriction member 21 from the retracted position toward the restricting position, i.e., urges the restriction member 21 rearward.

As illustrated in FIGS. 2 and 7, the fourth spring 34 is a leaf spring positioned at an upper portion inside the housing 11. The fourth spring 34 is positioned away from the first abutment portion 12B of the cover 12 when the cover 12 is at the open position as illustrated in FIG. 2. On the other hand, the fourth spring 34 is pressed downward by the first abutment portion 12B when the cover 12 is at the closed position to generate a restoration force directed upward in the fourth spring 34 as illustrated in FIG. 7. That is, the fourth spring 34 is configured to urge the cover 12 from the closed position toward the open position, i.e., urge the cover 12 upward.

[Tape Cassette]

The printing cassette 100 accommodates therein a printing medium (i.e., the printing tape in the present embodiment). The printing cassette 100 is attachable to and detachable from the device body 10. By replacing the printing cassette 100 with a new printing cassette 100, the printing medium can be supplied and kinds of the printing medium such as color or material can be selectively changed.

Figure 13:
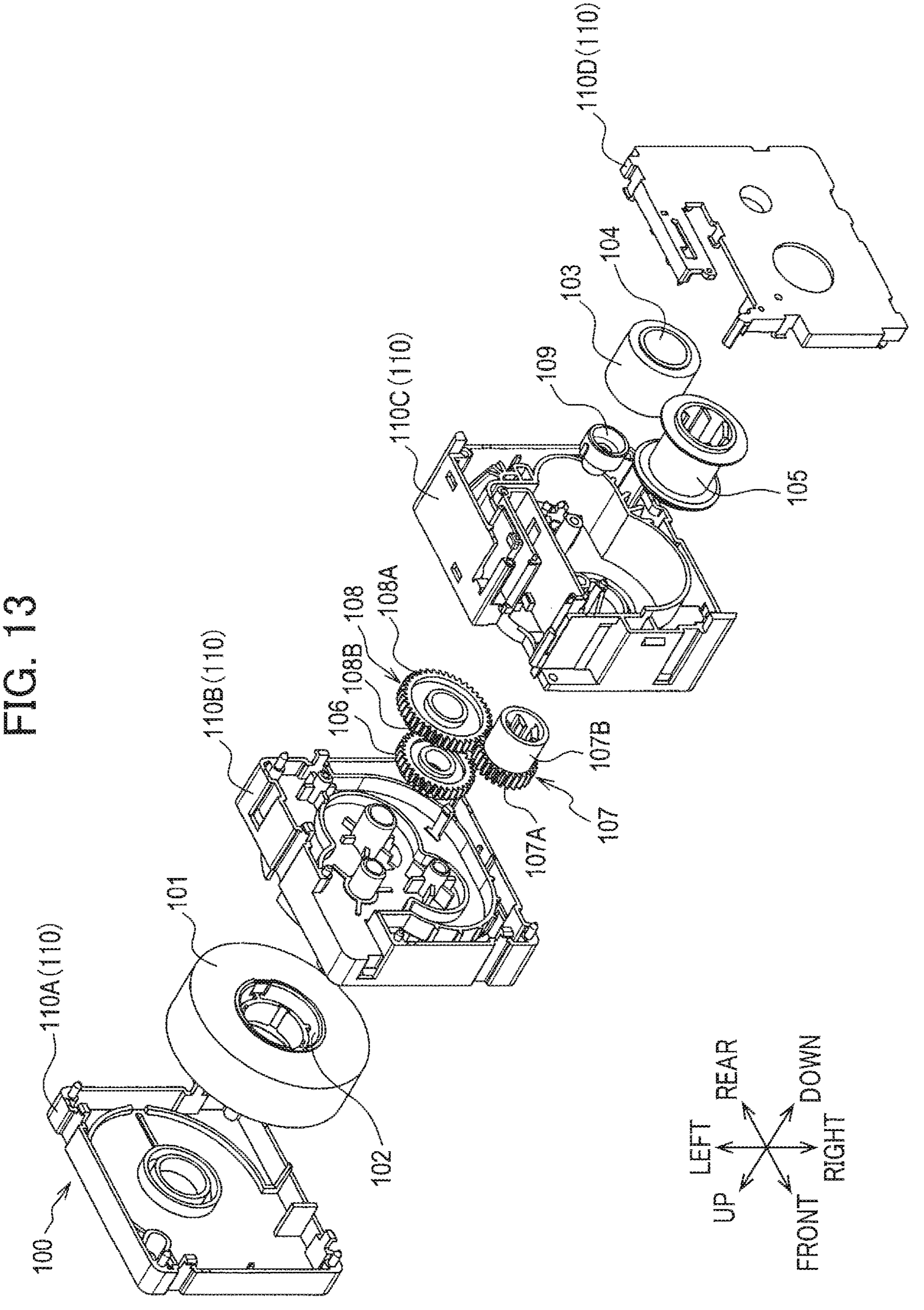
FIG. 13 is a schematic exploded perspective view of a tape cassette in the printing device in FIG. 1A.

As illustrated in FIG. 13, the printing cassette 100 includes a case 110, a first roll 101, a first supply spool 102, a second roll 103, a second supply spool 104, the take-up spool 105, the output gear 106, the input gear 107, an idle gear 108, and a clutch spring holder 109.

[Case]

The case 110 accommodates therein the first and second rolls 101 and 103, the spools 102, 104 and 105, and the gears 106, 107 and 108. The case 110 is in a form of a rectangular parallelepiped shape having four sides parallel to the up-down direction, four sides parallel to the front-rear direction, and four sides parallel to the left-right direction. The case 110 is constituted by a first part 110A, a second part 110B, a third part 110C, and a fourth part 110D those are assembled together in the up-down direction.

[First Roll]

The first roll 101 is formed by winding the printing tape over the first supply spool 102. The printing tape has a surface subjected to printing by the printing head 13 of the device body 10 and by the ink ribbon.

[First Supply Spool]

The first supply spool 102 is rotatable about a rotation axis extending in the up-down direction. Rotation of the platen roller 15 conveys the printing tape to rotate the first supply spool 102, whereby the printing tape is conveyed to the printing head 13.

[Second Roll]

The second roll 103 is formed by winding the ink ribbon over the second supply spool 104. The ink ribbon is to be superimposed with the printing tape such that printing is performed on the printing tape by the printing head 13. The ink ribbon that has been used for printing is taken up by the take-up spool 105. The clutch spring holder 109 holds a clutch spring (not illustrated) which applies rotational resistance to the second roll 103.

[Second Supply Spool]

The second supply spool 104 is rotatable about a rotation axis extending in the up-down direction. The second supply spool 104 is rotatable in accordance with rotation of the take-up spool 105 for taking up the ink ribbon, thereby causing the ink ribbon to be conveyed to the printing head 13.

[Take-Up Spool]

The take-up spool 105 is rotatable about a rotation axis extending in the up-down direction. The take-up spool 105 has an inner peripheral surface at which spline teeth are provided. The drive shaft 17 of the device body 10 is configured to be engaged with the spline teeth of the take-up spool 105 when the printing cassette 100 is attached to the device body 10. The take-up spool 105 is rotatable following rotation of the drive shaft 17 to take up the ink ribbon around the take-up spool 105.

[Output Gear]

The output gear 106 is a gear for outputting a driving force for conveying the printing tape. Specifically, the output gear 106 is configured to transmit a driving force to the platen roller 15 through the platen gear 16 of the device body 10. The output gear 106 has a portion positioned outside the case 110. The output gear 106 is configured to meshingly engaged with the platen gear 16 in a state where the printing cassette 100 is attached to the device body 10.

[Input Gear]

The input gear 107 is indirectly engaged with the output gear 106 through the idle gear 108 to transmit a driving force to the output gear 106. A driving force from the drive source in the device body 10 is inputted into the input gear 107.

The input gear 107 includes an outer gear 107A, and a spool 107B having a hollow cylindrical shape. The spool 107B is fixed to the outer gear 107A, and has an inner peripheral surface at which spline teeth are provided. The outer gear 107A and the spool 107B are rotatable together due to a driving force inputted to the spool 107B.

The input gear 107 has a rotation axis extending through a hollow space of the take-up spool 105. That is, the drive shaft 17 is inserted through both the take-up spool 105 and the input gear 107. As a result, the input gear 107 and the take-up spool 105 are rotated together by the common drive source i.e., the drive shaft 17, even though the input gear 107 is not directly connected to the take-up spool 105.

[Idle Gear]

The idle gear 108 is drivingly connected to the input gear 107 and the output gear 106, that is, the idle gear 108 is in meshing engagement with the input gear 107 and the output gear 106 to transmit a driving force inputted into the input gear 107 to the output gear 106.

The idle gear 108 is a double-step gear including a first gear 108A in meshing engagement with the outer gear 107A of the input gear 107, and a second gear 108B coaxial with the first gear 108A and in meshing engagement with the output gear 106. The second gear 108B has a diameter smaller than that of the first gear 108A.

In an attached state of the printing cassette 100 to the device body 10, the drive shaft 17 extends through to be engaged with the input gear 107, and the platen gear 16 can be engaged with the output gear 106. Rotation of the input gear 107 caused by the rotation of the drive shaft 17 is transmitted to the platen roller 15 through the outer gear 107A, the first gear 108A and the second gear 108B of the idle gear 108, the output gear 106, and the platen gear 16 to rotate the platen roller 15. The rotation of the input gear 107 is also transmitted to the take-up spool 105 to take up the ink ribbon.

[Attachment and Detachment of Tape Cassette]

Hereinafter, attachment process of the printing cassette 100 to the device body 10 will be described. At the beginning of the attachment process, a user inserts the printing cassette 100 into the recessed portion 11C through the cassette attachment opening 11A from above while the cover 12 is at the open position, as illustrated in FIG. 1A.

In this state, that is, in a state where the cover 12 is at a position other than the closed position, the restriction member 21 is at the restricting position. Further, the holder 19 is at the non-nipping position, and the lever 20 is at the first position. Hence, the movement of the lever 20 toward the second position is restricted, because the second abutment portion 20C of the lever 20 is brought into abutment against the third abutment portion 21A of the restriction member 21 in a case where the user tries to move the lever 20 toward the second position.

After insertion of the printing cassette 100, the user pivotally moves the cover 12 to the closed position in which the printing cassette 100 and the cassette attachment opening 11A are covered by the cover 12. At this time, the restriction member 21 is moved toward the retracting position due to abutment of the engagement portion 12C of the cover 12 against the locking portion 21B of the restriction member 21. Consequently, the cover 12 is locked by the engagement between the locking portion 21B and the engagement portion 12C, and is retained at the closed position.

Figure 6A:
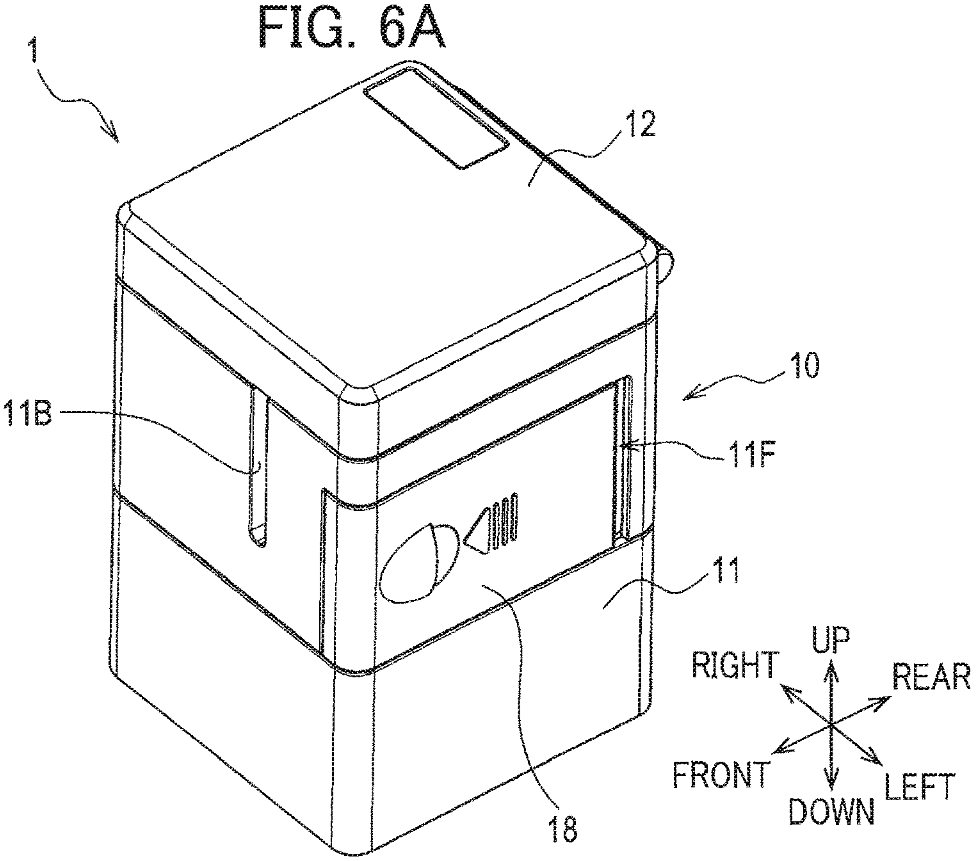
FIG. 6A is a schematic perspective view of the printing device illustrated in FIG. 1A, and particularly illustrating a state where a cover of the printing device is closed.
Figure 6B:
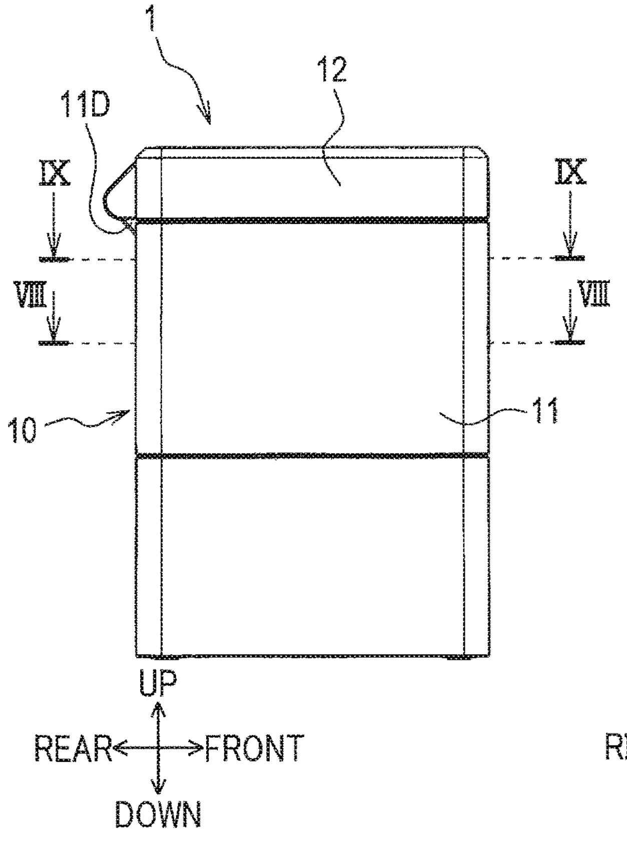
FIG. 6B is a schematic right side view of the printing device illustrated in FIG. 6A.
Figure 6C:
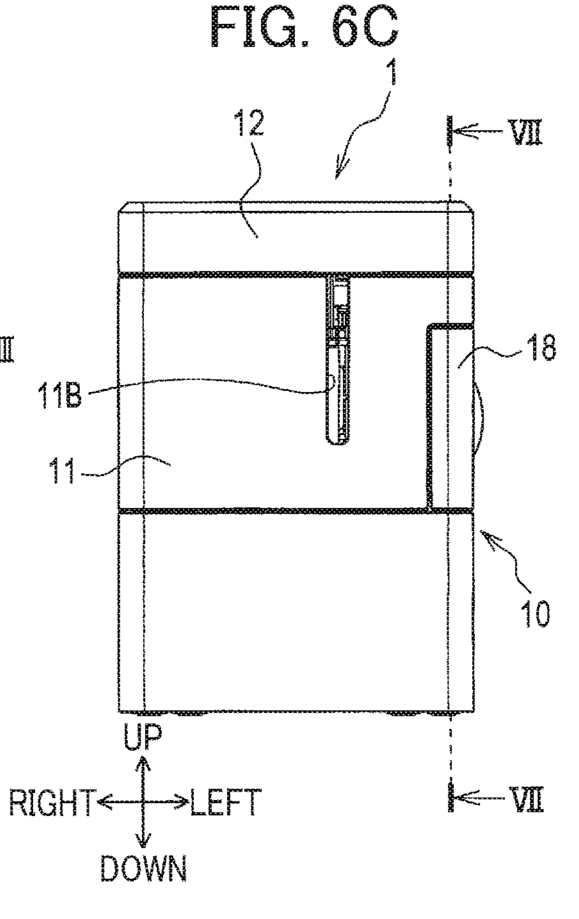
FIG. 6C is a schematic front view of the printing device illustrated in FIG. 6A.

After the cover 12 is closed, the user pivotally moves the lever 20 from the first position to the second position illustrated in FIG. 6A to cause the holder 19 to be moved from the non-nipping position to the nipping position. At this time, the platen gear 16 is brought into meshing engagement with the output gear 106 of the printing cassette 100 by the movement of the holder 19.

Further, the printing tape of the printing cassette 100 is nipped between the printing head 13 and the platen roller 15, and meshing engagement between the platen gear 16 and the output gear 106 is maintained by virtue of the engagement between the pawl 20B of the lever 20 and the groove 11G of the housing 11, thereby enabling the printing device 1 to perform printing.

Detachment process of the printing cassette 100 from the device body 10 will be described next. The user slidingly moves the lever 20 from the second position to the third position illustrated in FIG. 10A to cause the engagement between the pawl 20B and the groove 11G to be released. In accordance with the movement of the lever 20, the restriction member 21 is also moved from the retracted position to the release position to unlock the cover 12. The unlocked cover 12 is therefore moved upward to the open position due to an urging force of the fourth spring 34.

When the user releases his finger from the lever 20 that has been slidingly moved to the third position, the lever 20 is moved in the direction opposite the third direction D3, that is, the lever 20 is moved rearward due to an urging force of the first spring 31. The lever 20 is then moved back toward the first position together with the movement of the holder 19 from the non-nipping position caused by an urging force of the second spring 32. Further, the restriction member 21 is moved back to the restricting position from the release position due to an urging force of the third spring 33.

Then, the user takes the printing cassette 100 upward out of the housing 11 through the cassette attachment opening 11A to detach the printing cassette 100 from the device body 10.

1-2. Technical Advantages

The above-described embodiment exhibits the following technical advantages.

(a) The platen roller 15 is moved after the cover 12 is closed according to the present embodiment. This configuration can restrain displacement of the printing cassette 100 by the user touching the printing cassette 100 while the platen roller 15 is in contact with the printing tape. As a result, problems with respect to the printing tape occurred by nipping the printing tape by the platen roller 15 can be restrained.

(b) Since the moving direction of the holder 19 crosses the attachment direction of the printing cassette 100, the printing cassette 100 is unlikely to be displaced in the attachment direction due to a load required for moving the holder 19. Accordingly, displacement of the printing cassette 100 while the platen roller 15 is in contact with the printing tape can be suppressed. As a result, a trouble with respect to the printing tape by nipping the printing tape by the platen roller 15 can be restrained.

(c) Since a direction in which a load for moving the holder 19 is imparted is parallel to the moving direction of the holder 19, the movement of the holder 19 in the up-down direction is hard to occur, thereby restraining inclination of the rotation axis of the platen roller 15 relative to a surface of the printing head 13.

(d) The pressure portion 12A of the cover 12 is configured to press the printing cassette 100 attached to the housing 11 in the attachment direction when the cover 12 is at the closed position. Accordingly, the printing tape can be nipped between the platen roller 15 and the printing head 13 while the printing cassette 100 is retained at a prescribed position relative to the device body 10. Therefore, the printing tape and the ink ribbon can be accurately positioned relative to the printing head 13 and the platen roller 15 in the up-down direction.

(e) Since the restriction member 21 includes the locking portion 21B, the restriction member 21 not only allows the platen roller 15 to nip the printing tape but also locks the cover 12 at the closed position. This configuration can ensure the printing tape to be nipped by the platen roller 15 only when the cover 12 is at the closed position.

(f) The holder 19 is positioned inside the housing 11 when the holder 19 is positioned at the nipping position, and the lever 20 has the surface positioned to be flush with the outer surface of the housing 11 when the lever 20 is at the second position. Therefore, an outer profile of the printing device 1 while the printing device 1 is used can be made compact.

2. Modifications

While the description has been made in detail with reference to the specific embodiment, it would be apparent to those skilled in the art that the present disclosure need not be limited to the above-described embodiment and various changes and modifications may be made thereto.

(a) The cover 12 at the closed position need not cover the entire portion of the cassette attachment opening 11A, but may cover a portion of the cassette attachment opening 11A. Further, the cover 12 need not include the pressure portion 12A.

(b) The movable member 18 may not include the lever 20. For example, the nip condition of the printing tape by the platen roller 15 may be switched by directly moving the holder 19.

(c) The restriction member 21 may not include the locking portion 21B. For example, a locking member for locking the cover 12 at the closed position may be provided in the printing device 1 independently of the restriction member 21.

(d) The holder 19 may hold the printing head 13 in place of the platen roller 15. In this case, the platen roller 15 is supported by the housing 11 so as to be fixed relative to the housing 11 in place of the printing head 13. With this configuration, the printing head 13 is movable toward and away from the platen roller 15 to nip the printing tape between the printing head 13 and the platen roller 15.

(e) Although the printing tape is employed as a printing medium in the above-described embodiment, a printing paper, label, other kind of tape, tube and the like may be used as the printing medium.

(f) The functions possessed by a single component in the above-described embodiment may be distributed among a plurality of components, and/or the functions possessed by a plurality of components may be integrated into a single component. Further, a part of the configurations in the above-described embodiment may be omitted. Still further, at least a part of the configurations in the above-described embodiment may be added to or replaced with the configurations appearing in the modifications. Note that every aspect included in the technical concepts that can be identified by the recitations in the claims can be the embodiments of the present disclosure.

What is claimed is:

1. A printing device comprising:
a housing having a cassette attachment opening through which a printing cassette is attachable to the housing, the printing cassette accommodating therein a printing tape;
a cover movable between:
a closed position in which the cover covers at least a portion of the cassette attachment opening; and
an open position in which the cover allows the printing cassette to be attached to the housing through the cassette attachment opening;
a printing head provided inside the housing and extending toward the cassette attachment opening;
a platen roller provided inside the housing and facing the printing head;
a holder holding one of the printing head and the platen roller, the holder being movable between:
a nipping position in which the printing head and the platen roller nip the printing tape therebetween; and
a non-nipping position in which the printing head and the platen roller do not nip the printing tape therebetween; and
a restriction member restricting movement of the holder from the non-nipping position to the nipping position when the cover is at a position other than the closed position, the restriction member allowing the movement of the holder from the non-nipping position to the nipping position when the cover is at the closed position.

2. The printing device according to claim 1,
wherein the cover is configured to press the printing cassette attached to the housing in an attachment direction of the printing cassette to the housing when the cover is at the closed position.

3. The printing device according to claim 1, further comprising a lever movable from a first position to a second position,
wherein movement of the lever from the first position to the second position causes movement of the holder from the non-nipping position to the nipping position.

4. A printing device comprising:
a housing having a cassette attachment opening through which a printing cassette is attachable to the housing, the printing cassette accommodating therein a printing tape;
a cover movable between:
a closed position in which the cover covers at least a portion of the cassette attachment opening; and
an open position in which the cover allows the printing cassette to be attached to the housing through the cassette attachment opening;
a printing head provided inside the housing and extending toward the cassette attachment opening;
a platen roller provided inside the housing and facing the printing head;
a holder holding one of the printing head and the platen roller, the holder being movable between:
a nipping position in which the printing head and the platen roller nip the printing tape therebetween; and
a non-nipping position in which the printing head and the platen roller do not nip the printing tape therebetween;
a restriction member restricting movement of the holder when the cover is at a position other than the closed position, the restriction member allowing the movement of the holder when the cover is at the closed position; and
a lever movable from a first position to a second position,
wherein movement of the lever from the first position to the second position causes movement of the holder from the non-nipping position to the nipping position, and
wherein the restriction member is movable between:
a restricting position in which the restriction member is overlapped with a moving locus of the lever from the first position to the second position; and
a retracted position in which the restriction member is offset from the moving locus of the lever.

5. The printing device according to claim 4,
wherein the restriction member comprises a locking portion configured to lock the cover at the closed position.

6. The printing device according to claim 5,
wherein the restriction member is further movable to a release position in which the locking portion releases lock of the cover,
wherein the restriction member at the release position is positioned further in a first direction than the restriction member at the retracted position, the first direction being a direction directed from the restricting position toward the retracted position,
wherein the lever is movable in a second direction from the first position to the second position and movable in a third direction crossing the second direction, and
wherein the restriction member is movable from the retracted position to the release position in accordance with movement of the lever in the third direction.

7. The printing device according to claim 6,
wherein the third direction is parallel to a conveying direction in which the printing tape is conveyed by the platen roller.

8. The printing device according to claim 6,
wherein the lever is urged in a direction opposite the third direction.

9. The printing device according to claim 4,
wherein the lever comprises an abutment portion configured to abut against the restriction member, and
wherein the restriction member at the restricting position is overlapped with a moving path of the abutment portion during the movement of the lever from the first position to the second position.

10. The printing device according to claim 3, wherein at least a portion of the lever protrudes further outward than an outer surface of the housing when the lever is at the first position.

11. The printing device according to claim 10, wherein at least a portion of the holder protrudes further outward than the outer surface of the housing when the lever is at the first position.

12. The printing device according to claim 10, wherein a portion of the lever is flush with the outer surface of the housing when the lever is at the second position.

13. The printing device according to claim 3, wherein the lever comprises a pawl, the pawl being configured to be engaged with a groove formed at the housing when the lever is at the second position.

14. The printing device according to claim 3, wherein a moving direction of the lever is parallel to an imaginary plane perpendicular to a rotation axis of the platen roller.

15. The printing device according to claim 1, wherein the restriction member is movable between:

a restricting position in which the restriction member restricts the movement of the holder; and a retracted position in which the restriction member allows the movement of the holder, and wherein the restriction member is urged from the retracted position toward the restricting position.

16. The printing device according to claim 1, wherein the cover is urged from the closed position toward the open position.

17. The printing device according to claim 1, wherein the holder is urged from the nipping position toward the non-nipping position.

18. The printing device according to claim 1, wherein the housing further has a discharge opening through which the printing tape is discharged out of the housing, wherein the cover is pivotally movable about a pivot axis, and wherein the pivot axis of the cover is positioned on an opposite side of a rotation axis of the platen roller from the discharge opening.

19. A printing device comprising:

a housing having a cassette attachment opening through which a printing cassette is attachable to the housing, the printing cassette accommodating therein a printing tape;

a cover movable between:

a closed position in which the cover covers at least a portion of the cassette attachment opening; and an open position in which the cover allows the printing cassette to be attached to the housing through the cassette attachment opening;

a printing head provided inside the housing and extending toward the cassette attachment opening;

a platen roller provided inside the housing and facing the printing head;

a holder holding one of the printing head and the platen roller, the holder being movable between:

a nipping position in which the printing head and the platen roller nip the printing tape therebetween; and a non-nipping position in which the printing head and the platen roller do not nip the printing tape therebetween;

a restriction member restricting movement of the holder when the cover is at a position other than the closed position, the restriction member allowing the movement of the holder when the cover is at the closed position; and a head holding portion holding the printing head, the head holding portion having a first end and a second end in a conveying direction in which the printing tape is conveyed at the printing head, the first end being positioned downstream of the second end in the conveying direction, wherein a distance in the conveying direction between the first end and a portion of an outer surface of the housing positioned close to the first end is greater than a distance in the conveying direction between the second end and a portion of the outer surface of the housing positioned close to the second end.

20. A printing device comprising:

a housing having a cassette attachment opening through which a printing cassette is attachable to the housing, the printing cassette accommodating therein a printing tape;

a printing head provided inside the housing and extending toward the cassette attachment opening;

a platen roller provided inside the housing and facing the printing head; and a movable member comprising a holder holding one of the printing head and the platen roller, the holder being movable between:

a nipping position in which the printing head and the platen roller nip the printing tape therebetween; and a non-nipping position in which the printing head and the platen roller do not nip the printing tape therebetween, wherein a moving direction of the holder from the non-nipping position to the nipping position crosses an attachment direction of the printing cassette to the housing, wherein the housing further has an opening formed at an outer surface of the housing, and wherein the movable member is exposed to an outside of the housing through the opening.

21. The printing device according to claim 20, wherein at least a portion of the holder protrudes further outward than the outer surface of the housing when the holder is at the non-nipping position.

22. The printing device according to claim 20, wherein an outer surface of the holder is flush with the outer surface of the housing, or an entire portion of the holder is positioned further inward than the outer surface of the housing when the holder is at the nipping position.

23. The printing device according to claim 20, further comprising a platen gear provided inside the housing and connected to the platen roller to drive the platen roller, wherein the printing cassette comprises a gear configured to transmit a driving force to the platen gear, wherein the platen gear is positioned away from the gear when the holder is at the non-nipping position, and wherein the platen gear is in meshing engagement with the gear when the holder is at the nipping position.

24. The printing device according to claim 20, further comprising a head holding portion holding the printing head, the head holding portion having a first end and a second end in a conveying direction in which the printing tape is conveyed at the printing head, the first end being positioned downstream of the second end in the conveying direction, wherein a distance in the conveying direction between the first end and a portion of the outer surface of the housing positioned close to the first end is greater than a distance in the conveying direction between the second end and a portion of the outer surface of the housing positioned close to the second end.

* * * * *